Aug. 13, 1963 A. C. DEGUTIS ETAL 3,100,604

WEB SPLICING APPARATUS

Filed June 29, 1959 9 Sheets-Sheet 1

INVENTORS
ANTHONY C. DEGUTIS
ALBERT L. PETERSON
BY
Pennie, Edmonds, Morton, Barrows & Taylor
ATTORNEYS Aug. 13, 1963 A. C. DEGUTIS ETAL 3,100,604

WEB SPLICING APPARATUS

Filed June 29, 1959 9 Sheets-Sheet 2

INVENTORS
ANTHONY C. DEGUTIS
ALBERT L. PETERSON
BY
Pennie, Edmonds, Morton, Barrows & Taylor
ATTORNEYS INVENTORS
ANTHONY C. DEGUTIS
ALBERT L. PETERSON
BY
Pennie, Edmonds, Morton, Barrows & Taylor
ATTORNEYS Aug. 13, 1963 A. C. DEGUTIS ETAL 3,100,604

WEB SPLICING APPARATUS

Filed June 29, 1959 9 Sheets-Sheet 4

INVENTORS
ANTHONY C. DEGUTIS
ALBERT L. PETERSON
BY
Pennie, Edmonds, Morton, Barrows & Taylor
ATTORNEYS INVENTORS
ANTHONY C. DEGUTIS
ALBERT L. PETERSON
BY
Pennie, Edmonds, Morton, Barrows & Taylor
ATTORNEYS INVENTORS
ANTHONY C. DEGUTIS
ALBERT L. PETERSON
BY
Pennie, Edmonds, Morton, Barrows & Taylor
ATTORNEYS Aug. 13, 1963 A. C. DEGUTIS ETAL 3,100,604
WEB SPLICING APPARATUS
Filed June 29, 1959 9 Sheets-Sheet 7

INVENTORS
ANTHONY C. DEGUTIS
ALBERT L. PETERSON
BY
Pennie, Edmonds, Morton, Barrows & Taylor
ATTORNEYS Aug. 13, 1963 A. C. DEGUTIS ETAL 3,100,604

WEB SPLICING APPARATUS

Filed June 29, 1959 9 Sheets-Sheet 8

INVENTORS
ANTHONY C. DEGUTIS
ALBERT L. PETERSON
BY
Dennis, Edmonds, Morton, Barrows & Taylor
ATTORNEYS INVENTORS
ANTHONY C. DEGUTIS
ALBERT L. PETERSON
BY
Pennie, Edmonds, Morton, Barrows & Taylor
ATTORNEYS 3,100,604

WEB SPLICING APPARATUS

Anthony C. Degutis, Basking Ridge, and Albert L. Peterson, Westfield, N.J., assignors to Wood Newspaper Machinery Corporation, Plainfield, N.J., a corporation of Virginia Filed June 29, 1959, Ser. No. 823,555
11 Claims. (Cl. 242—58.3)

This invention relates generally to web splicing apparatus for splicing a moving web running from a supply roll to a web using device onto a web of a reserve roll. More particularly the invention concerns an apparatus wherein the tension of the web during the splicing operation remains substantially constant and wherein the tail length of the old web extending from the point of splice to the point of severance remains substantially constant in length notwithstanding the speed of the moving web.

Paper or other flexible webs that are fed to printing presses or other web using apparatus, usually run from web rolls which must be replaced periodically as they are consumed. High speed web roll replacement as presently practiced involves apparatus in which a movable support or reel carries thereon a supply roll from which a web moves into a press. The reel also carries thereon one or more reserve rolls which may be accelerated by drive means so that the peripheral speed substantially equals that of the web moving from the supply roll into the press. The apparatus also has a paster arm which may, upon receipt of a signal, swing down so that a paster brush carried on the arm may engage the moving web running from the supply roll to force it into engagement with a glued portion of the web of the reserve roll which has been accelerated so that its peripheral speed equals the speed of the moving web. After the paste has been made, a severing knife mounted on the paster arm severs the old web running from the supply roll. Such apparatus is illustrated in United States Patent No. 2,629,562.

In the operation of presses such as newspaper presses it is a necessity that the web of paper moving into the press from supply rolls be at a substantially constant tension in order to minimize chance of breakage or tearing of the web and subsequent down time of the press in order to re-thread it. It is vitally important that the tension of the web moving into the press remain constant even during the process of splicing or pasting an old web moving from a supply roll onto a new web running from a reserve roll.

It is also highly desirable that the tail of the old web trailing behind the point where the old and new webs are spliced together, be kept as short as possible. A long tail of web trailing behind the splice is undesirable because such products as printed pages, wrappings, etc. formed from the double thickness web must be discarded, and the long web tail frequently flies out from the running web particularly at points where the web turns at sharp angles in passing through the press, with the result that the tail becomes fouled with other sections of the web or other mechanisms.

If the speed of the press is momentarily higher than normal at the time the moving web is severed from the supply roll, the length of tail will be longer than normal if no provision is made in the timing of the actuation of the severing knife for the press speed. Conversely, if the speed of the web moving into the press is slower than normal, the length of tail will be shorter than desired and may be so short that there is not a sufficient area of the old web pasted onto the new web running from the web reserve roll to form a strong splice.

An important feature which affects accurate pasting of the moving web running from a supply roll onto a web of a reserve roll is the precise positioning of the reserve roll with respect to the paster brush which forces the moving web onto a glued portion of the web on the supply roll. A web roll as received from a mill may vary in diameter and in order to insure that the outer periphery of the roll will always be in a predetermined position with respect to the paster arm immediately before pasting, it is important that the reel supporting the roll be easily and accurately positioned so as to allow for any variance in roll diameter.

It is also important in splicing that the drive means for accelerating the reserve roll up to a speed so that its peripheral speed equals that of the moving web be such that it will not damage or wrinkle the web on the roll. Previously in some splicing devices the reserve roll accelerating drive means contacted the reserve roll web at the outer periphery of the reserve roll at a single point and when a drive force was exerted on the drive means, oftentimes it would cause a ripple or tear in the web.

In accordance with the present invention, it is proposed to include in a web splicing apparatus a web tension device of the type generally illustrated in application Serial No. 709,152, filed January 15, 1958, now Patent No. 3,039,714. Broadly, the splicing apparatus consists of a movable support or reel for rotatably supporting a web supply roll and a web reserve roll. Support driving means are provided for moving the support and a roll accelerating arm is pivotally mounted above the path of movement of the roll support so that it may engage the reserve roll to accelerate it to a peripheral speed substantially equal to the speed of the moving web. A paster arm is pivotally mounted above the web supply roll and has thereon a paster brush for pasting the moving web running from the web supply roll to the press or other web using apparatus onto the web of the reserve roll. A severing knife is also mounted on the paster arm for severing the moving web from the web supply roll after the moving web has been pasted to the web of the web reserve roll.

Pneumatic roll braking means are provided for maintaining substantially constant tension on the moving web running from the web supply roll. The roll braking means comprises a floating roller engaging the moving web, at least one tension belt contacting the web supply roll, a pneumatically operated piston for controlling tension in the tension belt and a variable pressure control valve connected to a source of pneumatic pressure and operated by movement of the floating roller for controlling pneumatic pressure exerted on the piston.

A roll accelerating belt is mounted on the roll accelerating arm and is adapted to engage a substantial portion of the outer periphery of the reserve roll after the roll has been moved into pasting position. Belt driving means are provided which have thereon a pneumatic drive brake means comprising a pneumatically operated disc brake which in turn is connected by a conduit to the variable pressure control valve. A splicing valve is included in the conduit for connecting the pneumatic disc brake means to the variable pressure control valve after the web has been severed by the severing knife, so that tension control of the web running into the press is maintained throughout the splicing operation. In addition, shuttle valve means are provided for connecting the tension cylinder directly to a source of line pressure and by-passing the variable pressure control valve so that the butt or exhausted supply roll may be braked down immediately after the severing knife has severed the web running from the supply roll.

In addition, we propose to use a support positioning means which contacts the web reserve roll and which positions the outer periphery of the web reserve roll at a predetermined position from the paster arm when it is in the pasting position. The positioning means comprises generally a retractable arm having at the end thereof a pivoted bracket the legs of which contact the outer periphery of the reserve roll. The bracket in turn has mounted thereon a lug which is pivotally joined to a cam arm having a cam rise thereon. A cam follower is adapted to follow the cam rise and upon engagement with the highest point of the rise actuates a switch to stop the movement of the reel or movable support upon which the reserve roll is mounted.

We also propose to provide for a severing timer means which is responsive to the speed of the moving web and which controls the operation of the severing knife to compensate for varying web speeds. The severing timer means comprises generally a ball-driven differential which is driven by the reserve roll accelerating means. Upon completion of an electrical circuit when wires contained in the roll accelerating drive means contact a conducting tab mounted on the periphery of the reserve roll, a solenoid is actuated to unlock a ball cage of the ball differential which has mounted thereon a cam surface. A cam follower is adapted to follow the cam surface and actuate a switch which in turn actuates the severing knife. The differential is so designed that the ball cage will rotate when released and when the solenoid is energized at a speed higher than normal. After a preset interval of time the solenoid will be deenergized and the rotation of the cage will return to a normal speed. Thus, the faster the press runs, the faster will the cage rotate and so cause the cam follower to actuate the severing knife sooner in order to maintain constant tail length.

Referring to the drawings in which a preferred embodiment of our invention is illustrated, FIG. 1 is a schematic side view of our web splicing apparatus showing the apparatus with a full or fresh supply roll in the normal press running position;

Figure 1:
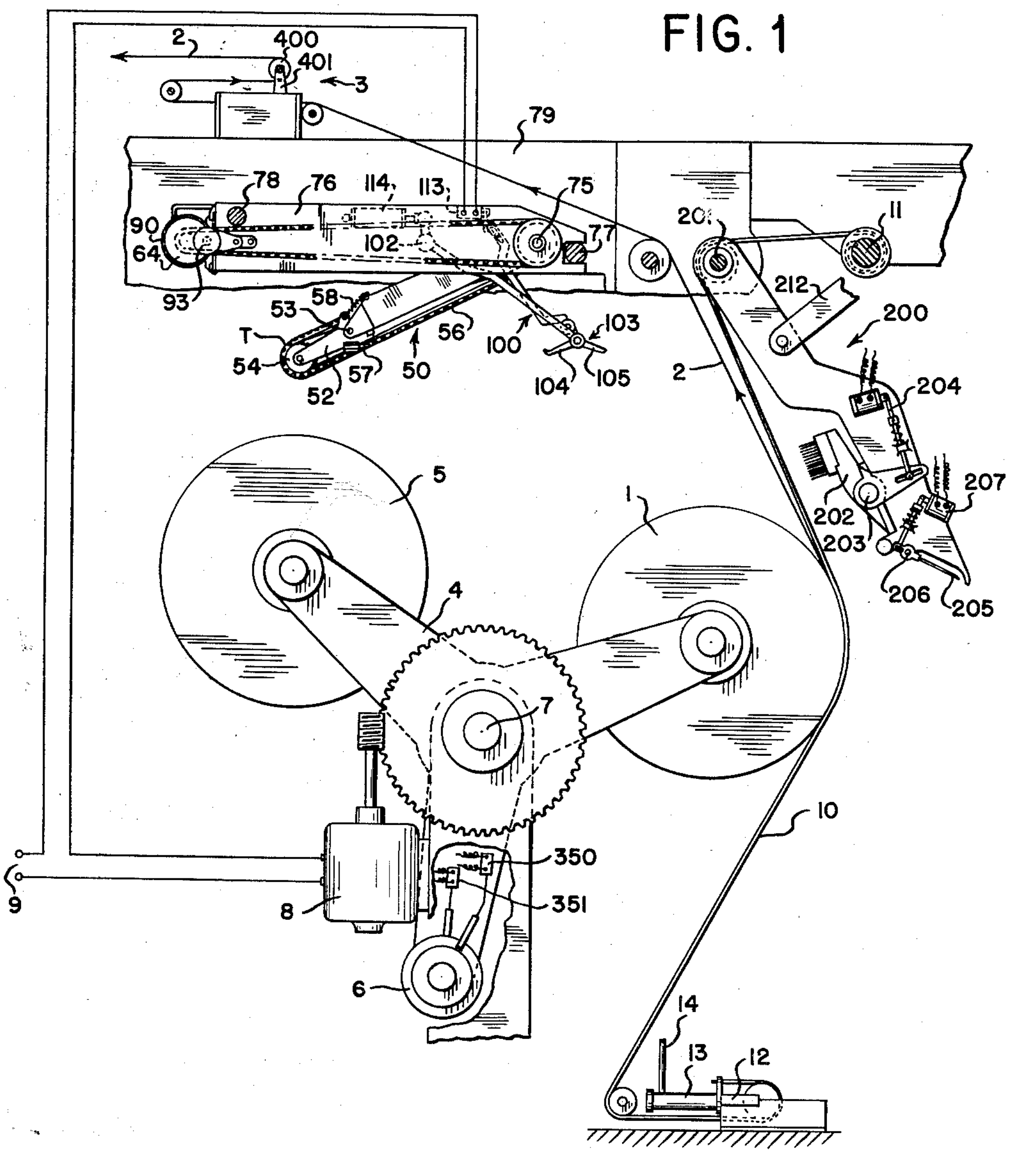

Referring to the drawings in detail and particularly to FIG. 1, 1 denotes a web supply roll from which a moving web 2 runs to a press or other web-using apparatus not shown. A pneumatic tension device such as described in the previously mentioned application Serial No. 709,152 and denoted generally by 3 is positioned between the web-using apparatus and the splicing apparatus to maintain a substantially constant tension in the web. The supply roll 1 is rotatably mounted in a support means or reel 4 which in turn rotatably carries thereon a reserve roll 5, and as shown in FIG. 1, an exhausted supply or butt roll 6. The reel 4 is rotated about a shaft 7 by means of an electric motor 8. Electric motor 8 in turn is connected by means of circuits to a source of electric current 9.

Figure 14:
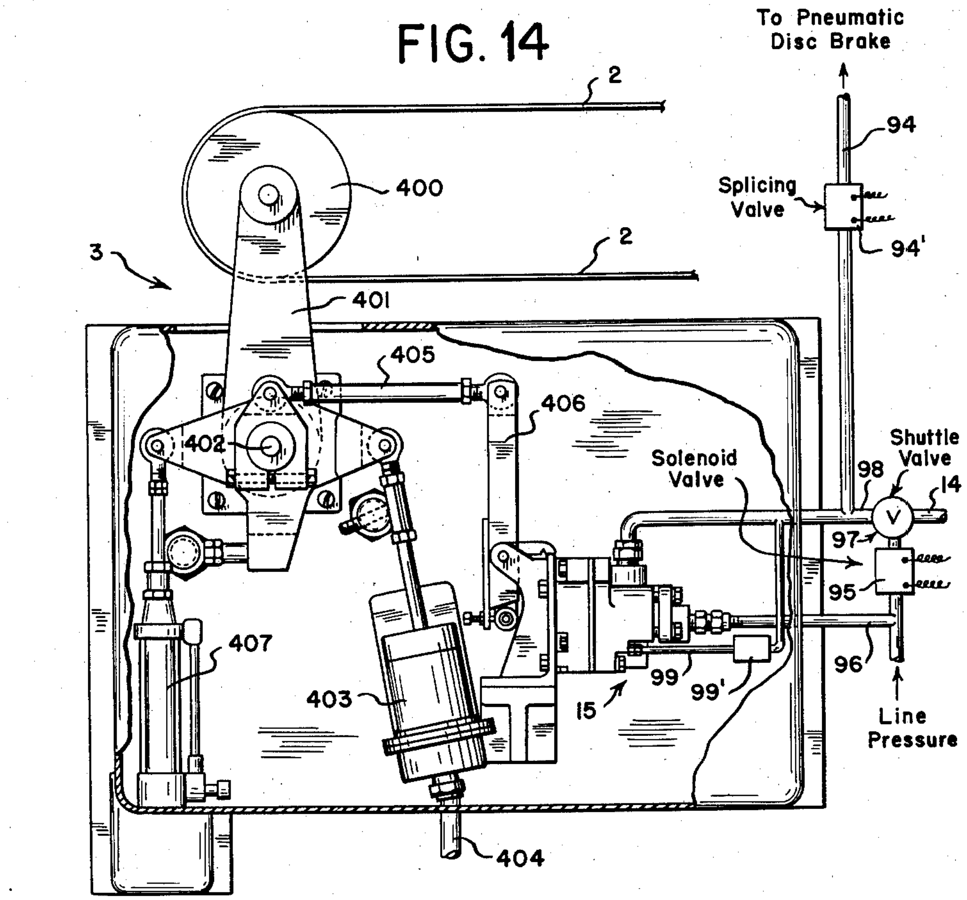
FIG. 14 is an enlarged partial sectional view of the pneumatic tension control means illustrated in FIG. 1.

A tension belt 10 extends over the rotatable supply roll 1 and is connected at one end to a fixed point 11 and at its other end to a tension piston 12 which is slidable in pneumatic tension cylinder 13 under the influence of pneumatic pressure. Tension cylinder 13 is connected by means of a conduit 14 to a variable pressure control valve denoted generally by 15 as shown in FIG. 14. A roll accelerating arm denoted generally by 50 and a roll positioning arm denoted generally by 100, extend above and in the path of movement of the reel 4. Roll accelerating arm 50 is mounted on a shaft 75 which extends across the reel and parallel to the axis of the rolls. Shaft 75 in turn is carried by a frame 76 which is movable laterally of the web and splicing apparatus along tracks 77 and 78 which in turn are mounted on the frame 79 of the web splicing apparatus as best seen in FIG. 7.

A paster arm denoted generally by 200 is rotatably mounted on a shaft 201 which is carried by the frame 79 of the web splicing apparatus. The paster arm 200 has mounted thereon a paster brush 202 which is rotatable about a point 203 when actuated by means of a solenoid 204. Mounted on the end of the arm and below the paster brush is a severing knife 205 which is rotatable about a point 206 when actuated by means of a solenoid 207. Arm 200 is shown in FIG. 1 in the up or normal position, while in FIG. 3 it is shown in the pasting position. The arm 200 is moved to and from the pasting position by means of a pneumatically operated piston 210 which is slidable in a pneumatic cylinder 211 and which is connected to the paster arm by means of a link 212, all as shown in FIG. 5. The pneumatic cylinder 211 is connected to a solenoid-operated valve 213 by means of conduits 214 and 215. A conduit 216 connects the valve 213 to a source of pneumatic pressure.

Figure 7:
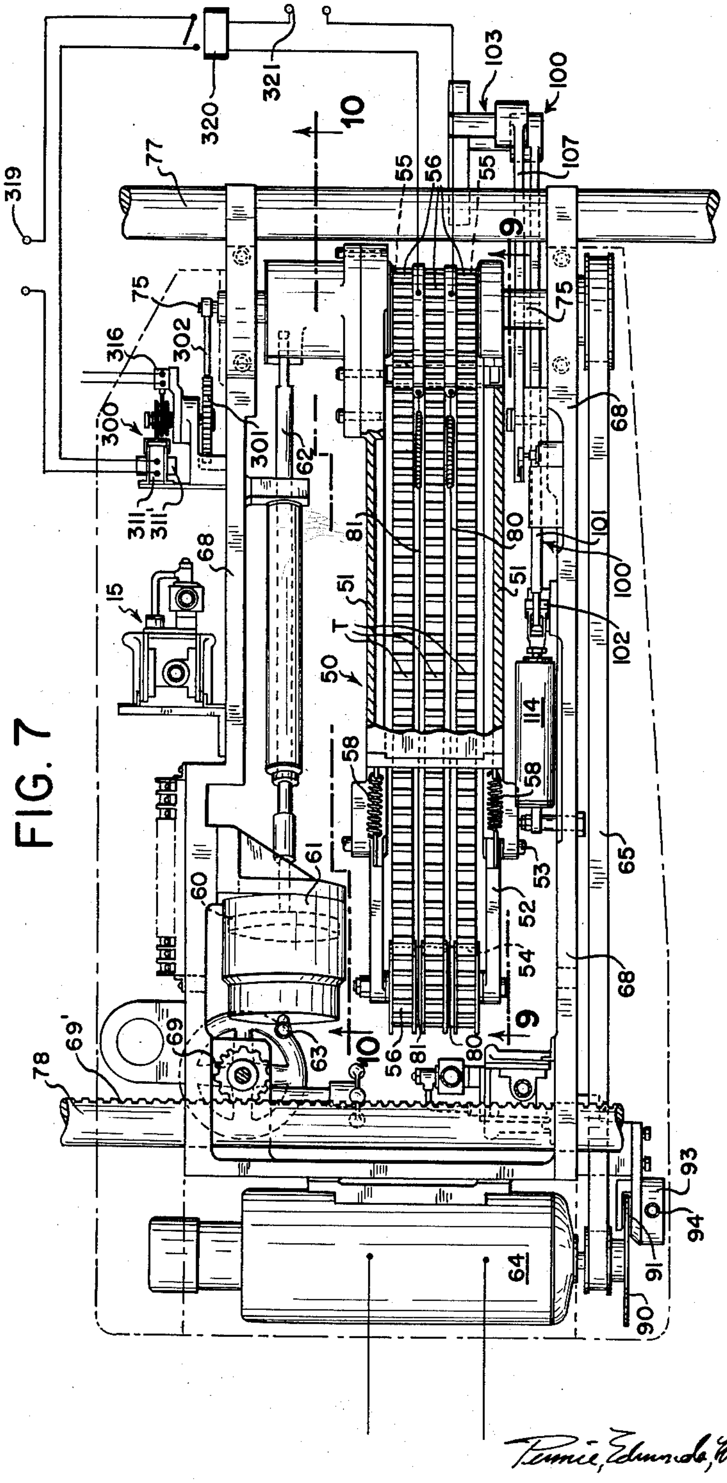
FIG. 7 is an enlarged plan view of a part of apparatus illustrating the web accelerating drive means and drive belt.
Figure 9:
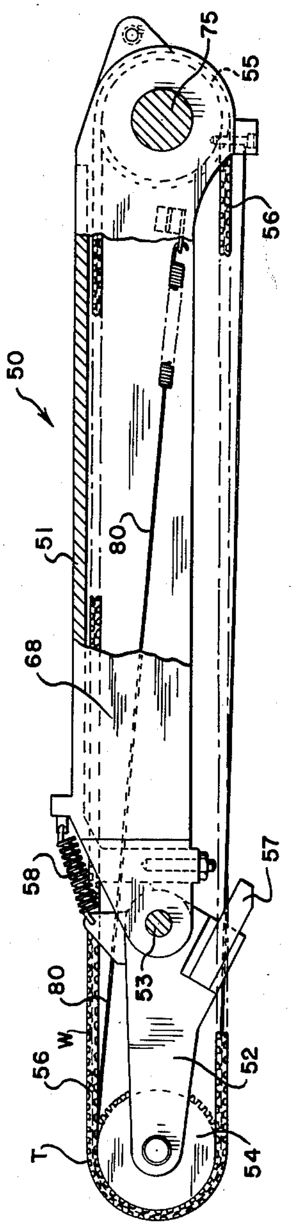
FIG. 9 is a sectional view of FIG. 7 taken along lines 9—9.

The roll accelerating arm 50, as best shown in FIGS. 7 and 9, comprises a frame 51 which is carried by and which is rotatable about shaft 75. Pivotally mounted on the end of member 51 is an extension 52 which is rotatable about a shaft 53. A cog 54 is rotatably mounted on the end of extension 52 while a cog 55 is mounted on shaft 75. Extending over cogs 54 and 55 are three roll accelerating drive belts 56 as shown in FIG. 7.

The belts 56 include a transversely corrugated tread T as shown in FIG. 9 formed of a partially compressible and preferably resilient material around forming wires W carried in the interior of the belts. The tread T is characterized by transverse corrugations which present a succession of lands separated by intervening valleys that run across the tread substantially parallel to the axis of the cogs 54 and 55 in order that ripling of the web on the reserve roll when the belt contacts the outer periphery of the reserve roll, is eliminated for the reasons disclosed in Patent No. 2,629,562. It has been found however, that when driving a reserve roll of a very thin, fragile paper, there is a tendency for the rubber corrugations of a driving wheel such as that disclosed in Patent 2,629,562, to disturb the outer wrap of the roll due to the fact that the outer periphery of the corrugations change their pitch circle with respect to the roll as the wheel is compressed when it encounters the surface of a roll. This is because the corrugations are made of a compressible material so that the pitch circle or pitch line at which they contact the roll varies from the point at which the top of each corrugation contacts the periphery of the roll to a point at which there is maximum contact between each corrugation and the surface of the roll on a line connecting the center of the roll to the center of the driving wheel. Further, there is a reversal of this action as the corrugation progresses to the point at which it leaves the surface of the roll.

While there is a somewhat similar action of the corrugations on a drive belt when a corrugated belt wraps itself around a reserve roll, the tendency for rippling of the outer wrap of the roll is not as great as when a corrugated driving wheel is used. As a belt goes from a position of tangency to the roll surface to a point of engagement of the roll there is a slight decrease in distance between adjacent corrugations. However, this decrease is smaller than when a corrugated driving wheel is used because it occurs at the radius of the roll which is large when compared with the radius of a drive wheel. Further, any tendency to pull the paper together between corrugations is relatively slight when it is compared with the total circumference of the roll which is not in contact with the belt corrugations and which is available to yield paper. The result is that any looseness, bunching or wrinkling of paper between the corrugations of the belt passes harmlessly beneath the belt rather than building up ahead of the belt.

A projection 57 is carried by the extension 52 so that when the arm 50 engages the outer periphery of a reserve roll, the projection 57 will initially engage the reserve roll and will cause the extension 52 to rotate about shaft 53 so that the belts 56 may be bent around and engage a substantial portion of the outer periphery of the reserve roll instead of a single point. By this means, the force exerted by the drive belt on the web of the reserve roll will be distributed over a greater area so that there will be less likelihood of tearing or ripping the web due to the relatively large force that must be applied in order to accelerate the heavy reserve roll to the proper splicing speed. A spring 58 urges the extension 52 in a clockwise direction as shown in FIG. 9 so that the accelerating arm is automatically adjustable for reserve rolls having varying diameters.

Figure 3:
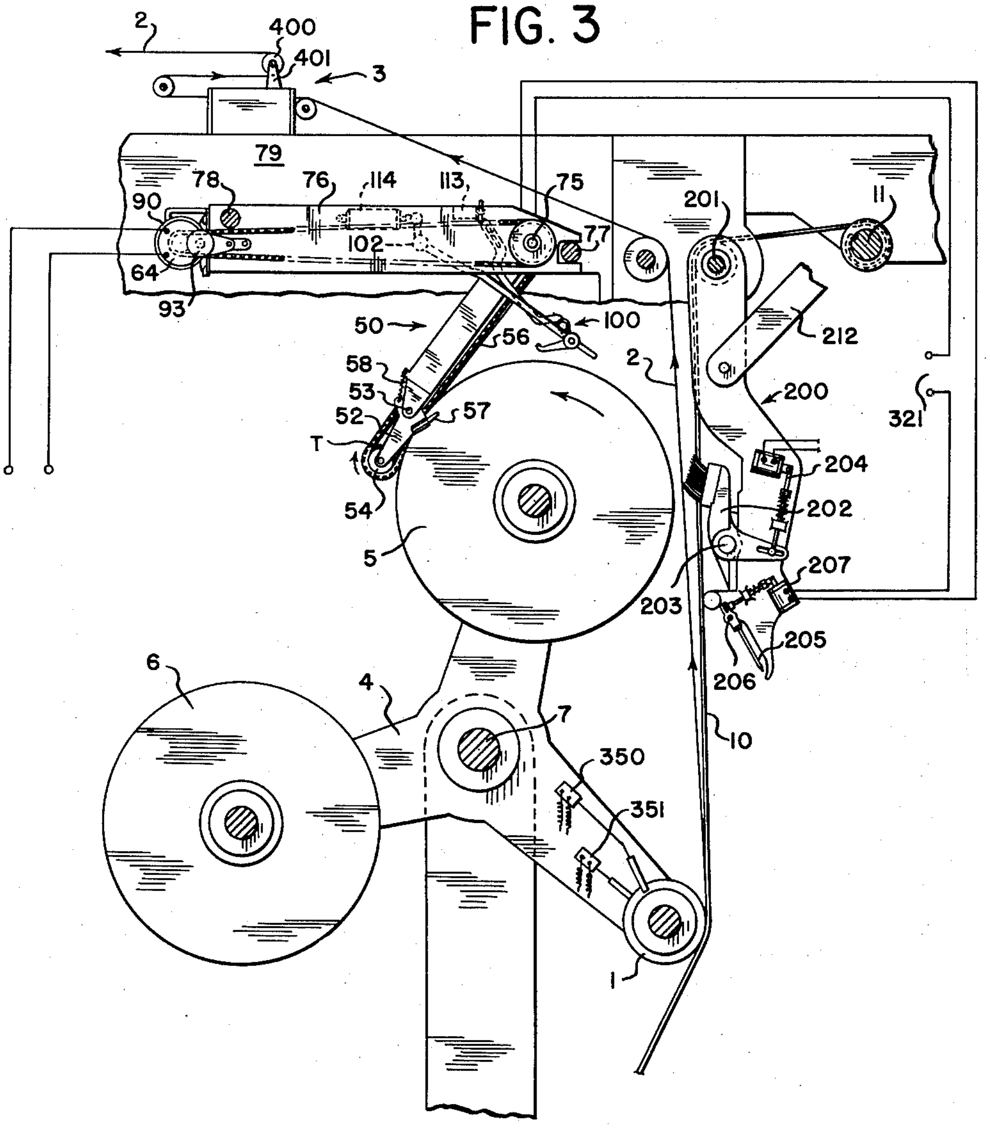
FIG. 3 is a view similar to FIG. 1 showing the apparatus with a nearly exhausted supply roll and a reserve roll in position for splicing.
Figures 4, 5:
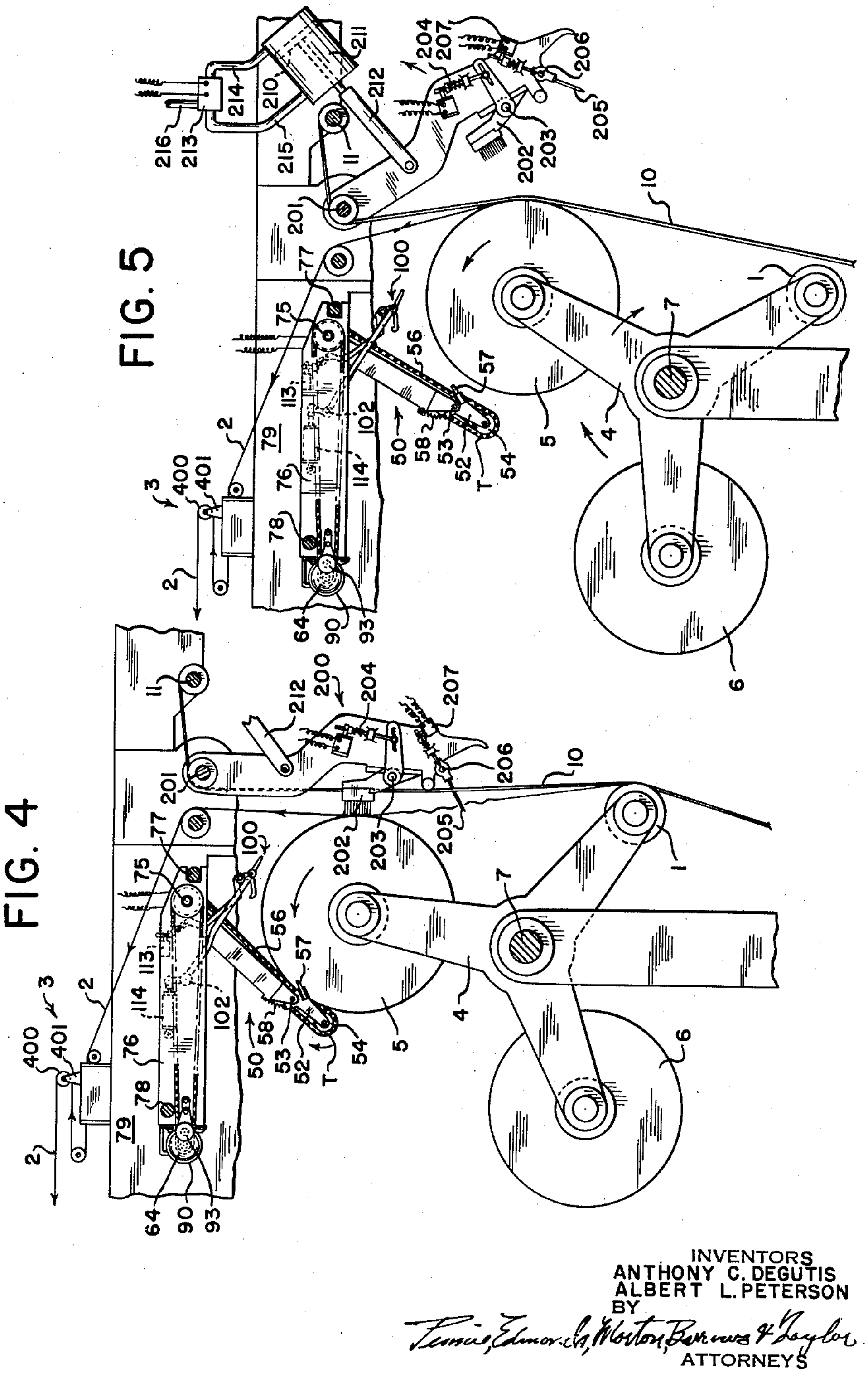
FIG. 4 is a view similar to FIG. 1 showing the old web being pasted on to the web of the reserve roll and being severed from the exhausted supply roll.
FIG. 5 is a view similar to FIG. 1 immedaitely after the moving web has been spliced on to the web reserve roll and the reel has begun rotation to the position as shown in FIG. 1.
Figure 10:
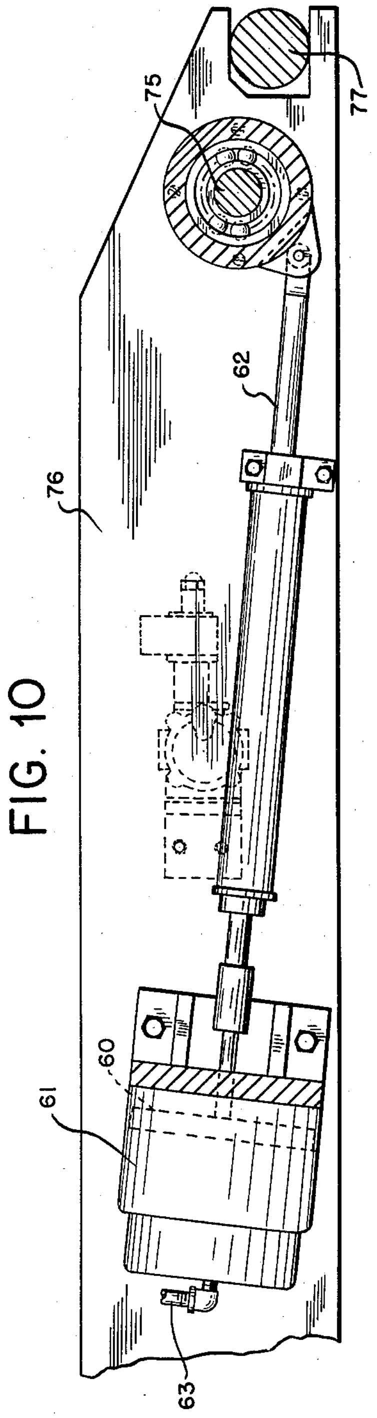
FIG. 10 is a sectional view of FIG. 7 taken along lines 10—10.

The roll accelerating arm 50 is rotated about shaft 75 to the roll-engaging position as shown in FIG. 3 by means of pneumatic piston 60 which is movable in a housing 61 and which connects to the frame 51 of the roll accelerating arm by means of the link 62 as shown in FIG. 10. Pneumatic housing 61 in turn is connected by means of a conduit 63 to a solenoid-operated valve, not shown, which is connected to a pneumatic source of pressure, also not shown.

The roll accelerating belts 56 are driven by means of an electric motor 64 as shown in FIG. 7, which is connected by means of a drive belt 65 to the shaft 75 on which the cogs 55 are mounted. The complete roll accelerating arm and electric motor 64 are mounted on a frame 68 which is slidable on shafts 77 and 78 so that the roll accelerating arm may be positioned laterally with respect to the reserve rolls in order that the accelerating means may accelerate rolls having varying widths. A hand gear 69 engages a rack 69′ carried on the shaft 78 to facilitate lateral positioning of the roll accelerating means.

Figure 6:
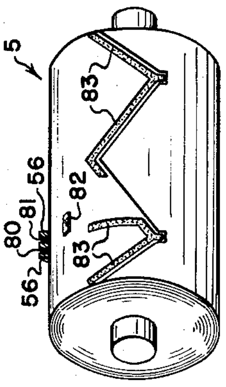
FIG. 6 is a perspective view illustrating the makeup of a web reserve roll before splicing.

Two thin conductive wires 80 and 81 are positioned between the belts 56 and are adapted to engage a conductive tab 82 which is pasted on the outer periphery of the reserve roll as shown in FIG. 6 when the roll accelerating arm has been brought into contact with the reserve roll in order to complete a circuit to actuate the severing knife. By placing the wires between the belts they are protected while at the same time they will have a greater arc of contact with the roll since they will extend around the articulated roll accelerating arm. Further, in the event that there is any inadvertent bunching or rippling of paper, the wires will rise with the belts to pass over the bunch of paper so minimizing any damage to the wires. The conductive tab 82 can be made of aluminum or other conductive material. The roll 5 is prepared for splicing by having a glued portion as indicated by 83 on the end of the web such that when the paster brush engages the moving web as shown in FIG. 4, the moving web will be brought into contact with the glued portions 83. It is important that the tab 82 not extend over any glued portion since any glue coming into contact with and accruing to the wires might affect their conductivity. For this reason, a blank space is left on the end of the web on the reserve roll which is not glued as shown in FIG. 6.

Figure 2:
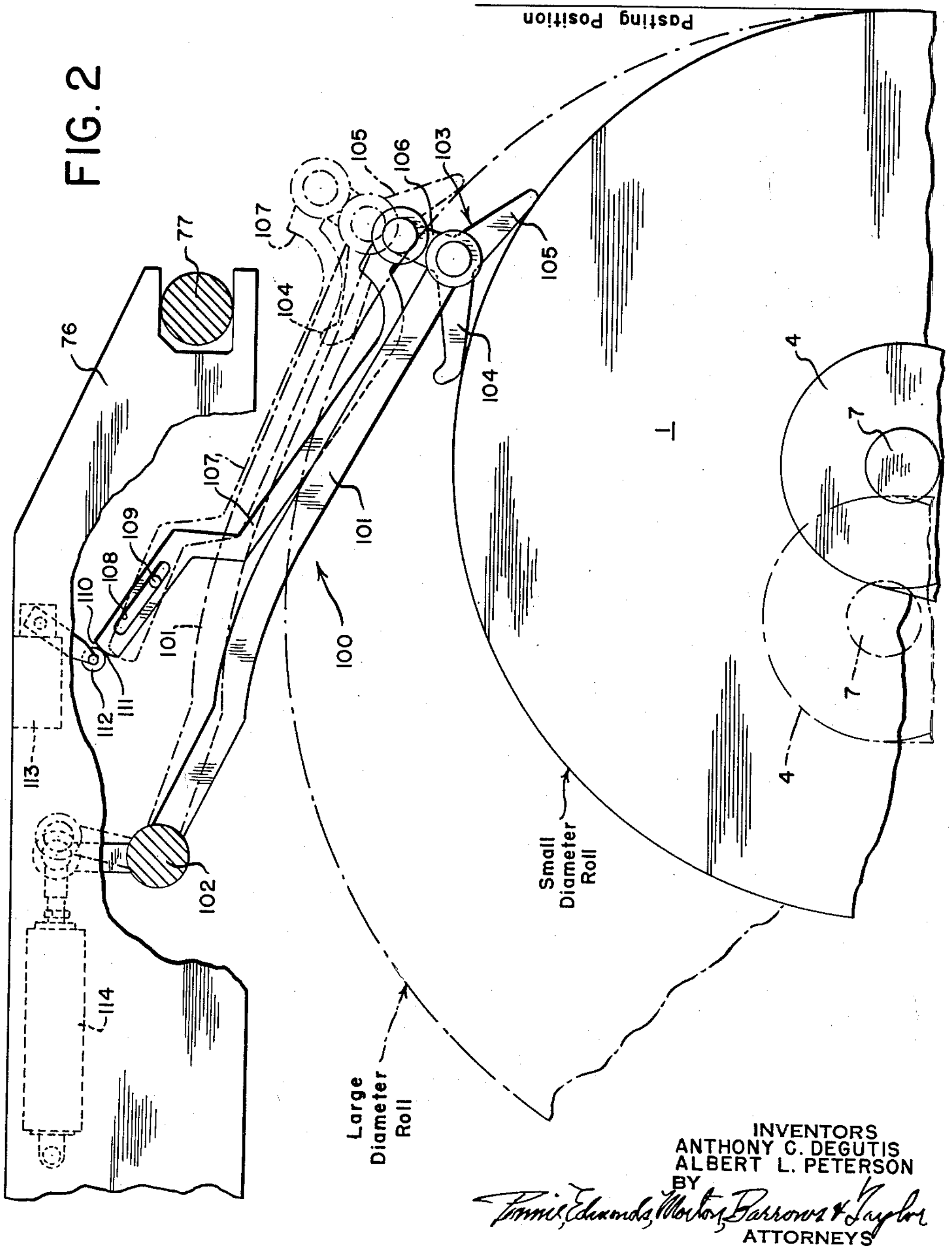
FIG. 2 is an enlarged schematic view of the roll positioning arm illustrating its contact with reserve rolls of various diameters.
Figure 8:
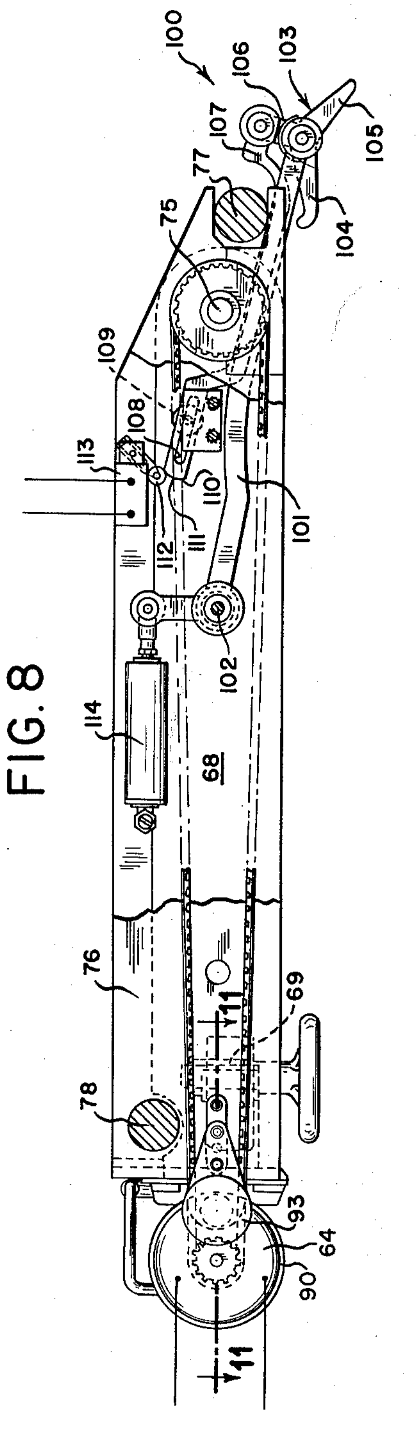
FIG. 8 is a partial sectional side view of FIG. 7.

The roll positioning means 100 as shown in FIGS. 2 and 8, comprises an arm 101 which is rotatable about a shaft 102 carried by the frame 68 which mounts the roll accelerating arm. A bracket 103 is rotatably mounted on the end of arm 101 and has thereon arms 104 and 105 which engage the outer periphery of a reserve roll when the reel 4 is rotated to bring a reserve roll to the position as shown in FIG. 2. Integral with the bracket 103 is a lug 106 which is turn has rotatably mounted on the end thereof a cam arm 107 which is slotted at 108 so that a stud 109 carried by the frame 68 may ride therein. The cam arm 107 has a cam surface 110 which has at the middle thereof a cam rise 111. A cam follower 112 is adapted to follow the cam surface 110 and rise 111 to actuate an electrical switch 113. Switch 113 in turn is included in the circuit of the electric motor 8 so that when the cam follower 112 is raised to a particular point by rise 111, it will break the electric circuit and thus stop motor 8 and rotation of the reel 4. A pneumatic piston (not shown) is movable in pneumatic housing 114 and is connected to a portion of the arm 101 in order to rotate it about 102.

Referring to FIG. 2, it is apparent that if a reserve roll of larger diameter than normal is brought into contact with the legs 104 and 105 of the positioning arm by movement of the reel 4 in the clockwise direction, that the bracket 103 will likewise be caused to rotate in a clockwise direction and so move the cam arm 107 to the right. However, since the roll is larger than normal, the arm 101 will be higher when the edge of the roll is in pasting position than when a smaller diameter roll is used. This will have the effect of moving arm 101 to the left to actuate the switch 113 and so stop the reel motor sooner than if a smaller diameter roll were used, so that the distance from the outer periphery of the reserve roll when in pasting position with respect to the paster arm will always be constant notwithstanding roll diameter. This is an important feature since the time for the paster brush to push the moving web into contact with the reserve roll must necessarily depend on the distance the brush must travel. Thus if the timing is to remain constant, the distance the brush travels must remain constant.

Figure 11:
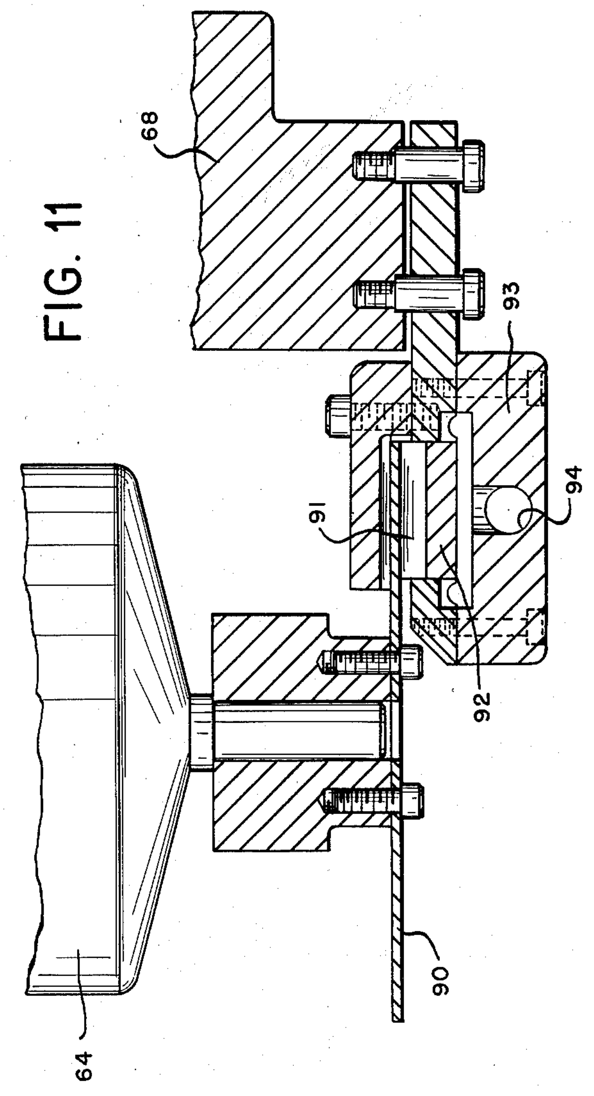
FIG. 11 is an enlarged sectional plan view of the apparatus illustrating the pneumatic drive brake means.

The roll accelerating drive motor 64 has at one end thereof a disc brake 90 as shown in FIG. 11 which is adapted to be engaged by a friction pad 91 which is contained on one end of pneumatic piston 92. Pneumatic piston 92 is movable in pneumatic cylinder 93 which is connected by means of a conduit 94 to the outlet 98 of the variable pressure control valve 15 shown in FIG. 14. Conduit 94 has interposed therein a solenoid operated splicing valve 94′. Conduit 14 which runs to the tension cylinder 13 is connected by means of a pressure differential operated shuttle valve 97 to either conduit 96 or to a conduit 98. Shuttle valve 97 in turn is actuated by means of a solenoid valve 95 which when open, will allow line pressure to be exerted on the shuttle valve to cause it to connect conduit 14 with the line pressure. Conduit 96 connects the upstream side of the variable pressure control valve with the line pressure (i.e., source of pressure) while conduit 98 connects to the downstream side of the variable pressure control valve 15. A rate of control conduit 99 has a rate valve 99′ by which adjustment of the characteristic of the rate of response of the tension brake means 13 and the disc brake means 93 in response to movement of the floating roller may be regulated in the manner taught in application Serial No. 709,-152, now Patent No. 3,039,714.

The pneumatic roll braking means 3 as shown in FIG. 14 comprises a floating roller 400 over which the web 2 passes. Roller 400 is journaled on the end of a floating arm 401 which is rotatable about the shaft 402. The arm 401 is urged in the counter-clockwise direction as shown in FIG. 14 by means of an air motor 403 to increase tension in the web. Motor 403 is connected by a conduit 404 to a manual pressure control valve, not shown, by which the desired tension in the web may be regulated. The arm 401 is connected by means of link 405 to a treadle 406 which in turn may actuate the variable pressure control valve so that pneumatic pressure may be exerted either on the tension piston 12 or disc brake 93 to increase tension in the web. A dampener 407 is connected at one end to the arm 401 to dampen its movement.

In operation, a predetermined tension is set in the web by allowing a set pneumatic pressure to be exerted on the air motor. The motor will urge the arm 401 in the counter-clockwise direction as shown in FIG. 14 to increase the pull of the roller on the web and thus to exert a tension on the web. If tension in the web momentarily decreases, the arm will move further in the counter-clockwise direction under the force of the air motor causing the treadle 406 to move to actuate the variable pressure control valve. Actuation of the valve 15 in turn will cause a charge of pressure to be exerted on the tension piston 12 or disc brake 93 to brake the roll from which the moving web runs. This in turn will increase tension in the web until the arm 401 moves clockwise to again balance the system.

In normal operation solenoid valve 95 is closed so that shuttle valve 97 connects conduits 14 and 98 in order that tension of the web moving into the press is maintained substantially constant in the manner taught in the aforesaid application. After the reserve roll has been brought into pasting position and at the instant the severing knife severs the old web running from the supply roll, the splicing valve 94′ is opened to connect conduit 94 to conduit 98 in order that pneumatic pressure from the variable pressure control valve may exert a braking force on the disc 90 of the drive motor 64. At the same time the drive motor 64 is deenergized solenoid valve 95 is energized to cause shuttle valve 97 to connect conduit 14 direct to the line source of pneumatic pressure so that braking force is exerted on the tension belt 10 in order to brake the exhausted butt roll quickly.

After the web has been severed, the paster arm is raised and the reel rotates toward the tension belt. The solenoid valve 95 is deenergized allowing the tension cylinder to again be connected to the outlet side of the variable pressure control valve through the shuttle valve 97 and conduit 14. As the reel continues to rotate forward, the solenoid operated splicing valve 94′ becomes deenergized disconnecting the pneumatic disc brake from the variable pressure control valve so that tension in the web is controlled solely by the tension belt.

Figure 12:
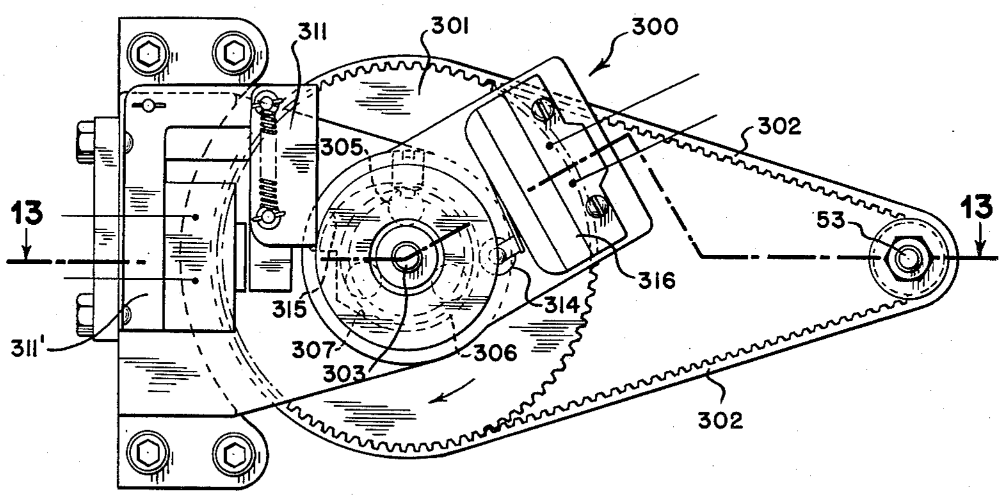
FIG. 12 is an enlarged side view of the apparatus illustrating the severing timer means.
Figure 13:
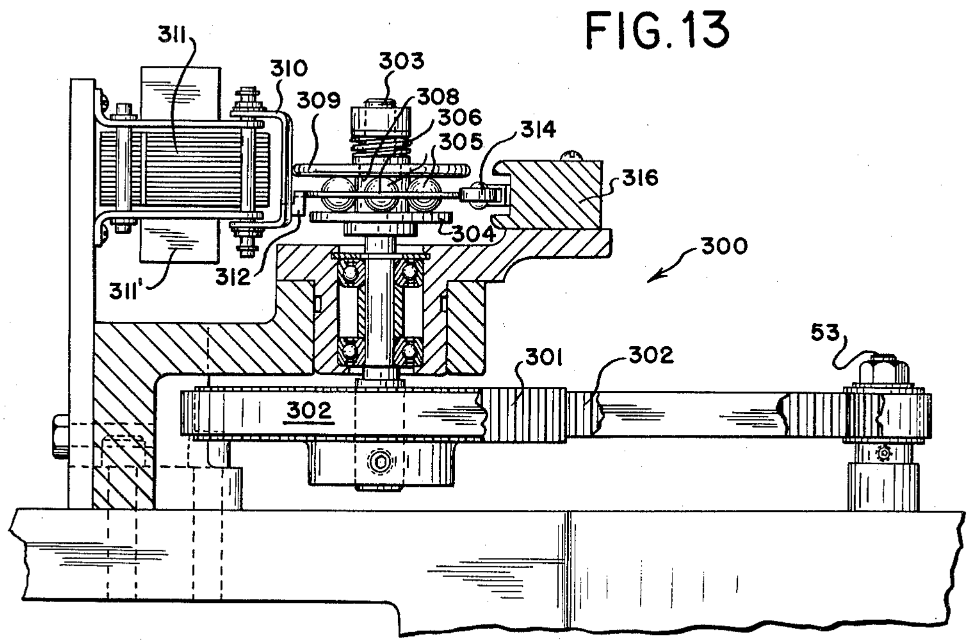
FIG. 13 is a view of FIG. 12 taken along lines 13—13.

Reference is now made to FIGS. 12 and 13 where the severing timer means denoted generally by 300 is illustrated. The severing timer means is mounted on the side of the frame 68 as shown in FIG. 7 and comprises a cog 301 which is driven by a belt 302 which in turn is connected to and driven by the drive shaft 75 of the roll accelerating means. The timing means 300 has a shaft 303 on which the cog 301 is mounted and on which there is also mounted a ball raceway 304. A plurality of balls 305 are rotatably mounted on the raceway 304 and are separated by means of a ball cage 306 which has thereon a cam surface 307. Contacting the outer portion of the balls is a raceway 308 which has on the outer surface thereof a rubber ring 309 which may engage a bracket 310 carried on armature 311 of solenoid 311′. The bracket 310 has thereon a projection 312 which is adapted to engage the cage 306 when the solenoid is not energized. The bracket also engages the ring portion 309 when the solenoid is not energized so that both the cage and raceway 308 will slip on the shaft 303. A cam follower 314 is adapted to follow the cam surface 307 and when it engages the cam rise 315 of the cam surface it will actuate a switch 316 so as to complete an electrical circuit in which the severing knife solenoid 207 is contained as shown in FIG. 3.

Solenoid 311′ is contained in a circuit having a source of electrical energy represented by terminals 319 and a relay 320 incorporating a timer. Relay 320 in turn is included in the same circuit as are wires 80, 81 and conductive tab 82 all as shown in FIG. 7 where terminals 321 represent a source of electrical current. When tab 82 contacts wires 80 and 81, a circuit is completed which energizes relay 320 which in turn completes a circuit to energize solenoid 311′. The duration of energization of solenoid 311′ is determined by regulation of the timer incorporated in relay 320. As solenoid 311′ is energized, armature 311 is caused to move to the left so releasing cage 306 and raceway 308 for rotation with shaft 303. When the solenoid is deenergized, only raceway 308 will be held against rotation by contact of the ring 309 with the bracket 310 and the cage 306 will then rotate at half the speed of the shaft 303 due to the differential construction of the device.

As cage 306 rotates in the direction as shown in FIG. 12, the cam follower 314 will contact the cam rise 315 to actuate switch 316 which in turn will close a circuit containing terminals 321 and the severing knife solenoid 207 controlling operation of the severing knife 105.

The length of tail may thus be regulated by varying the time the solenoid 311′ is energized. The length of tail set will remain constant notwithstanding press speed since the speed that the cage will rotate to actuate the severing knife solenoid will vary directly as the speed of the web driving means.

Figure 15:
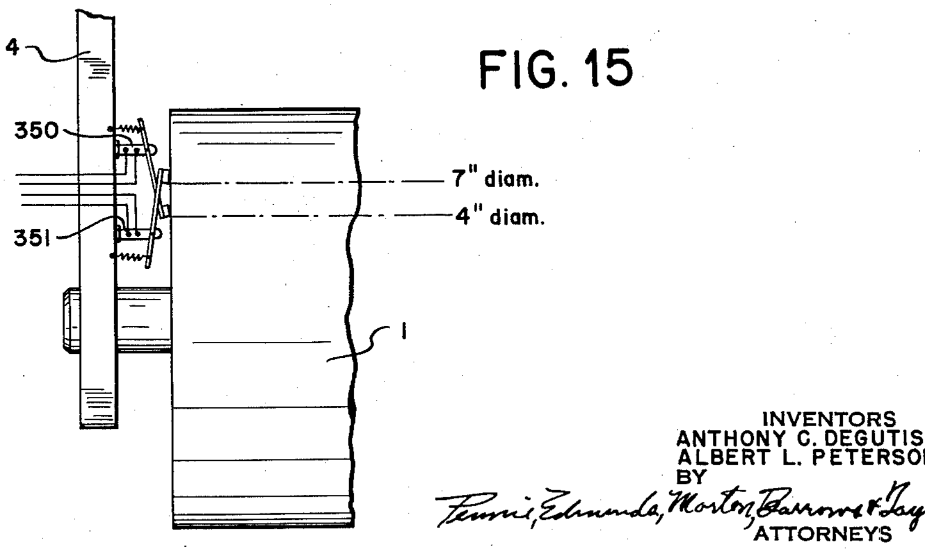
FIG. 15 is an enlarged partial end view of the apparatus illustrating the mounting of the supply roll.

Butt switches 350 and 351 are fixed on each arm of the reel as shown in FIGS. 1 and 15 and energize circuits when the supply roll from which the moving web runs wears down to predetermined diameter. Switch 351 is set to close when the reel wears down to approximately 7″ diameter and initiates the splicing cycle. Switch 350 is set to close when the diameter of the butt approximates 4½″ diameter and this switch makes the circuit containing the conducting wires 80 and 81 effective so that it may be completed when the wires contact the tab 82. Switch 350 at the same time completes a circuit to actuate the paster brush solenoid 204 to force the moving web into contact with the glued portions 83 of the reserve roll. For clarity, the switches 350 and 351 have been illustrated only on one arm of the reel although in fact, they are on all the arms.

The complete web splicing apparatus is provided with various relays, timers and limit switches which control the sequence of the various steps in the splicing cycle. These timers, relay switches and the circuitry joining them are conventional and have not been illustrated except insofar as they are helpful in explaining mechanical features of the apparatus.

The complete sequence of operation of the various parts of the apparatus during a splicing cycle is as follows: As the supply roll 1 wears down to approximately 7″, the switch 351 is actuated. This switch in turn will cause the positioning arm 100 to lower and the motor 8 to index the reel 4 forward until the switch 113 on positioning arm 100 is actuated which then stops motor 8. Actuation of the switch 113 at the same time will cause actuation of the solenoid operated valve 213 to cause pneumatic pressure to be admitted to cylinder 211 through conduit 214 to cause the paster arm to swing down in pasting position as shown in FIG. 2. At the same time a solenoid valve, not shown, is actuated to admit pressure to cylinder 61 to cause the roll accelerating arm 50 to fall into position where the belts 56 may engage the outer periphery of the reserve roll 5 and another solenoid, not shown, actuates a valve to raise arm 100.

When the paster arm 200 is in full down position, a limit switch is actuated to start up the roll accelerating drive motor 64 so that the peripheral speed of the reserve roll will be substantially equal to the speed of the moving web. As the supply roll 1 wears down to 4½" diameter, switch 350 is actuated to make the circuit containing the contact wires 80 and 81 and the conductive tab 82 effective while at the same time the paster brush solenoid is actuated to cause the brush 202 to force the moving web into engagement with the glued portions of the web of the reserve roll.

When the tab 82 contacts wires 80 and 81, the timer relay 320 is closed which in turn actuates the severing means timer 300 as heretofore explained. When the knife 205 has severed the web and is in the full down position as shown in FIG. 3, a limit switch is actuated by a cam on the knife shaft, all not shown, which in turn raises the paster arm 200 and starts the reel to rotate forward. The limit switch operated by the knife in the full down position will also cause the roll accelerating motor 64 to be deenergized, the solenoid operated shuttle valve 95 to be actuated to cause line pressure to be applied to the tension cylinder 13 to brake the butt roll and for the solenoid operated splicing valve 94' to be actuated in order that the pneumatic tension device 3 might exert braking force on the disc brake means 93.

During the preceding step, the reel continues to index forward until it reaches the position shown in FIG. 4 where a reel limit switch, not shown, located on the reel shaft is actuated. This reel limit switch when actuated will cause the accelerating arm 50 to rise. As the paster arm rises, the knife is reset, which in turn will deenergize solenoid 95 which will cause shuttle valve 97 to again connect conduit 14 with line 98. The sequence of control is automatically reset when the reel reaches normal operating position as shown in FIG. 1, at which time the expired butt roll may be replaced with a fresh reserve roll.

The web splicing apparatus described is effective to maintain constant tension on the moving web throughout the splicing cycle and at the same time to maintain tail lengths of minimum constant length notwithstanding press speed. While we have shown a preferred embodiment of our invention, it is to be understood that the apparatus is capable of modification and that changes in the construction and in the various cooperating parts may be made without departing from the spirit or scope of the invention, as expressed in the following claims.

We claim:

1. A web splicing apparatus for splicing a web from a web reserve roll onto a moving web running from a web supply roll comprising a movable support for rotatably supporting a web supply roll and a web reserve roll; support driving means for moving said support; a roll accelerating arm pivotally supported above the path of movement of said roll support; a paster arm pivotally supported above said web supply roll; a paster brush mounted on said paster arm for pasting said moving web running from said web supply roll onto the web of said web reserve roll; a severing knife mounted on said paster arm for severing the web from said web supply roll after said moving web has been pasted to the web of said web reserve roll; pneumatic roll braking means for maintaining substantially constant tension on said moving web running from said web supply roll comprising a floating roller contacting said moving web; a tension belt contacting said web supply roll, a pneumatically operated tension piston for controlling tension in said tension belt and a variable pressure control valve connected to a source of pneumatic pressure and operated by movement of said floating roller for controlling pneumatic pressure exerted on said piston; a roll accelerating belt mounted on said roll accelerating arm adapted to engage a substantial portion of the outer periphery of said reserve roll; roll accelerating belt drive means for driving said belt; pneumatic drive brake means connected to said roll accelerating belt drive means; splicing valve means for connecting said pneumatic drive brake means to said variable pressure control valve after said web has been severed by said severing knife; shutte valve means for connecting said pneumatically operated tension piston direct to said source of pneumatic pressure after said web has been severed by said severing knife; support positioning means contacting said web reserve roll to position the outer periphery of said web reserve roll at a predetermined distance from said paster brush regardless of the diameter of said web reserve roll; and severing timer means responsive to the speed of the moving web controlling movement of said severing knife to maintain a constant length of web from the point the web is severed to the point where said moving web running from said web supply roll is pasted to the web of said web reserve roll.

2. A web splicing apparatus for splicing a web from a web reserve roll onto a moving web running from a web supply roll comprising a movable support for rotatably supporting a web supply roll and web reserve roll, an articulated roll accelerating arm pivotally supported above the path of movement of said roll support, a roll accelerating belt mounted on said articulated roll accelerating arm adapted to engage and follow a substantial portion of the outer periphery of said web reserve roll, said belt being of substantially fixed dimension in a direction along its length and having a web roll surface engaging tread formed of partially compressible resilient material corrugated transversely of the tread, and roll accelerating belt drive means for driving said web roll accelerating belt.

3. In a web splicing apparatus for splicing a web from a web reserve roll on to a moving web running from a web supply roll having roll accelerating drive means for rotating said reserve roll so that its peripheral speed substantially equals the linear speed of said moving web; pasting means for pasting said moving web onto said web reserve roll; severing means for severing the moving web from said web supply roll; and pneumatic roll braking means for maintaining substantially constant tension in said moving web running from said web supply roll comprising a floating roller contacting said moving web, a tension belt contacting said web supply roll, a pneumatically operated tension piston for controlling tension in said tension belt, and a variable pressure control valve connected to a source of pressure and operated by movement of said floating roller for controlling pneumatic pressure exerted on said piston; the improvement comprising pneumatic drive brake means connected to said roll accelerating drive means, splicing valve means for connecting said pneumatic drive brake means to said variable pressure control valve after said moving web has been severed from said supply roll by said severing means, and shuttle valve means for connecting said pneumatically operated piston direct to said source of pressure after said moving web has been severed from said supply roll.

4. In a web splicing apparatus according to claim 3 wherein said pneumatic drive brake means comprises a pneumatically operated clutch engaging disc connected to said roll accelerating drive means.

5. A web splicing apparatus for splicing a web from a web reserve roll on to a moving web running from a web supply roll comprising a movable roll support for rotatably supporting a web supply roll and a web reserve roll, an articulated roll accelerating arm pivotally supported above the path of movement of said roll support, a plurality of closely adjacent roll accelerating belts mounted on said articulated roll accelerating arm adapted to engage and follow a substantial portion of the outer periphery of said web reserve roll, each of said roll accelerating belts having a web roll surface engaging tread formed of partially compressible resilient material corrugated transversely of the tread, roll accelerating belt drive means for driving said web roll accelerating belt, and thin conductive wires positioned between adjacent belts and adapted to engage and follow a substantial portion of the outer periphery of said web reserve roll for contacting a conductive tab on said web reserve roll.

6. In a web splicing apparatus for splicing a web from a web reserve roll onto a moving web running from a web supply roll having a movable support for rotatably supporting a web supply roll and a web reserve roll, support drive means for moving said movable support, a paster arm pivotally supported above said web supply roll, a paster brush mounted on said paster arm for pasting said moving web running from said web supply roll onto the web on said web reserve roll; the improvement comprising support positioning means having a positioning arm pivotally mounted above the path of movement of said movable support, a bracket pivotally mounted on the end of said positioning arm and contacting at two points the outer periphery of said web reserve roll, a lug mounted on said bracket, a cam member pivotally mounted on the end of said lug having a cam surface, and a cam follower adapted to follow said cam surface, said cam surface engaging said cam follower and causing it to fall along a cut-off face on said cam surface when the outer edge of said web reserve roll is at a predetermined distance from said paster brush to stop said support drive means.

7. In a web splicing apparatus for splicing a web from a web reserve roll onto a moving web running from a web supply roll having roll accelerating drive means for accelerating said reserve roll to a peripheral speed substantially equal to the linear speed of said moving web, a paster brush for pasting said moving web onto a glued portion of the web of said reserve roll, and severing means for severing the web running from said supply roll after said moving web and said web from said reserve roll have been glued together; the improvement comprising having a severing timer means responsive to speed of the moving web controlling operation of said severing means to insure constant tail length of the web regardless of the speed of the moving web wherein said severing timer means comprises a drive portion driven by said roll accelerating drive means, a driven portion, a plurality of balls engaging said drive and said driven portions, a rotatable ball cage separating said balls and having a cam surface thereon, a severing means cam follower adapted to follow said cam surface and to actuate said severing means, movable release means for holding said ball cage against rotation and reserve roll position means for moving said release means.

8. In a web splicing apparatus for splicing a web extending from a web reserve roll on to a moving web running from a web supply roll having roll accelerating drive means for rotating said reserve roll so that its peripheral speed substantially equals the linear speed of said moving web; pasting means for pasting said moving web on to said web extending from said reserve roll; severing means for severing said moving web running from said supply roll; and pneumatic roll braking means for maintaining substantially constant tension in said moving web running comprising a floating roller contacting said moving web, a tension belt contacting said web supply roll, a pneumatically operated tension piston for controlling tension in said belt, and a variable pressure control valve connected to a source of pressure and operated by movement of said floating roller for controlling pneumatic pressure exerted on said piston; the improvement comprising a pneumatic drive brake means connected to said roll accelerating drive means, splicing valve means for connecting said pneumatic drive brake means to said variable pressure control valve after said moving web has been severed from said supply roll by said severing means whereby tension in said web is maintained substantially constant immediately after splicing.

9. A web splicing apparatus for splicing a web from a web reserve roll onto a moving web running from a web supply roll comprising a movable support for rotatably supporting a web supply roll and web reserve roll, a roll accelerating arm pivotally supported above the path of movement of said roll support, a roll accelerating belt mounted on said roll accelerating arm adapted to engage and follow a substantial portion of the outer periphery of said web reserve roll, a member of fixed length disposed within the body of said belt and extending the full length thereof, said belt having a web roll surface engaging tread formed of partially compressible resilient material corrugated transversely of the tread, and roll accelerating belt drive means for driving said web roll accelerating belt.

10. A web splicing apparatus for splicing a web from a web reserve roll onto a moving web running from a web supply roll comprising a movable support for rotatably supporting a web supply roll and web reserve roll, an articulated roll accelerating arm pivotally supported above the path of movement of said roll support, a roll accelerating belt mounted on said articulated roll accelerating arm adapted to engage and follow a substantial portion of the outer periphery of said web reserve roll, a member of fixed length disposed within the body of said belt and extending the full length thereof, a web roll engaging tread on the surface of the belt adapted to engage said web roll, said tread being corrugated transversely of the length of said belt, and roll accelerating belt drive means for driving said web roll accelerating belt.

11. A web splicing apparatus for splicing a web from a web reserve roll onto a moving web running from a web supply roll comprising a movable support for rotatably supporting a web supply roll and web reserve roll, an articulated roll accelerating arm pivotally supported above the path of movement of said roll support, a roll accelerating belt mounted on said articulated roll accelerating arm adapted to engage and follow a substantial portion of the outer periphery of said web reserve roll, said belt being of substantially fixed dimension in a direction along its length and having a web roll surface engaging tread corrugated transversely of the tread, and roll accelerating belt drive means for driving said web roll accelerating belt.

References Cited in the file of this patent

UNITED STATES PATENTS

| | | |
|---|---|---|
| 1,924,583 | Wood | Aug. 29, 1933 |
| 2,148,094 | Wood | Feb. 21, 1939 |
| 2,155,431 | Wieking | Apr. 25, 1939 |
| 2,290,109 | Mayne | July 14, 1942 |
| 2,386,346 | Roesen | Oct. 9, 1945 |
| 2,522,115 | Harper | Sept. 12, 1950 |
| 2,621,865 | Wieking | Dec. 16, 1952 |
| 2,689,095 | McWhorter | Sept. 14, 1954 |
| 2,629,562 | Tollison | Feb. 24, 1953 |
| 2,831,359 | Carle | Apr. 22, 1958 |

FOREIGN PATENTS

| | | |
|---|---|---|
| 1,070,189 | France | Feb. 17, 1954 |